(12) United States Patent
Kay (10) Patent No.: US 8,015,250 B2
(45) Date of Patent: Sep. 6, 2011

(54) METHOD AND SYSTEM FOR FILTERING ELECTRONIC MESSAGES

(75) Inventor: James Kay, Reading (GB)

(73) Assignee: Websense Hosted R&D Limited, Congleton (GB)

( * ) Notice: Subject to any disclaimer, the term of this patent is extended or adjusted under 35 U.S.C. 154(b) by 347 days.

(21) Appl. No.: 11/579,171

(22) PCT Filed: Jun. 22, 2006

(86) PCT No.: PCT/EP2006/063474
§ 371 (c)(1),
(2), (4) Date: Oct. 30, 2006

(87) PCT Pub. No.: WO2006/136605
PCT Pub. Date: Dec. 28, 2006

(65) Prior Publication Data
US 2008/0256187 A1    Oct. 16, 2008

(30) Foreign Application Priority Data
Jun. 22, 2005  (GB) .................................. 0512744.4

(51) Int. Cl.
*G06F 15/16* (2006.01)
(52) U.S. Cl. ......... 709/206; 709/203; 709/217; 709/225
(58) Field of Classification Search .................. 709/206, 709/203, 217, 225, 223; 715/205, 234
See application file for complete search history.

(56) References Cited

U.S. PATENT DOCUMENTS

| | | |
|---|---|---|
| 5,333,266 A | 7/1994 | Boaz et al. |
| 5,414,833 A | 5/1995 | Hershey et al. |
| 5,581,804 A | 12/1996 | Cameron et al. |
| 5,590,403 A | 12/1996 | Cameron et al. |
| 5,596,330 A | 1/1997 | Yokev et al. |
| 5,619,648 A | 4/1997 | Canale et al. |

(Continued)

FOREIGN PATENT DOCUMENTS

EP    1 058 199    5/2000

(Continued)

OTHER PUBLICATIONS

PCT International Search Report, Application No. PCT/EP2006/063474, Sep. 2006.

(Continued)

*Primary Examiner* — Ramy Osman
(74) *Attorney, Agent, or Firm* — Knobbe Martens Olson & Bear LLP (57) ABSTRACT

Embodiments of the invention provide a system and methods for filtering electronic messages having data therein identifying a link to a remote processing system. One embodiment provides a method which includes interrupting the transmission of the electronic message, identifying a link within the electronic message, and analyzing the electronic message on the basis of at least one of an attribute of the link and of at least an attribute intrinsic to the received electronic message so as to classify the message as either a suspect message or acceptable message. The method further includes modifying the electronic message so as to replace the link with an alternative network location corresponding to a remote processing system different from that corresponding to the link if the message is classified as a suspect message. The method further includes transmitting the electronic message unmodified if the message is classified as an acceptable message.

20 Claims, 5 Drawing Sheets

U.S. PATENT DOCUMENTS

| | | |
|---|---|---|
| 5,712,979 A | 1/1998 | Graber et al. |
| 5,720,033 A | 2/1998 | Deo |
| 5,724,576 A | 3/1998 | Letourneau |
| 5,742,769 A | 4/1998 | Lee et al. |
| 5,774,668 A | 6/1998 | Choquier |
| 5,801,747 A | 9/1998 | Bedard |
| 5,828,835 A | 10/1998 | Isfeld et al. |
| 5,832,228 A | 11/1998 | Holden et al. |
| 5,855,020 A | 12/1998 | Kirsch |
| 5,896,502 A | 4/1999 | Shieh et al. |
| 5,899,991 A | 5/1999 | Karch |
| 5,899,995 A | 5/1999 | Millier et al. |
| 5,911,043 A | 6/1999 | Duffy et al. |
| 5,919,257 A | 7/1999 | Trostle |
| 5,937,404 A | 8/1999 | Csaszar et al. |
| 5,963,941 A | 10/1999 | Hirakawa |
| 5,987,611 A | 11/1999 | Freund |
| 5,996,011 A | 11/1999 | Humes |
| 6,012,832 A | 1/2000 | Saunders et al. |
| 6,052,730 A | 4/2000 | Felciano et al. |
| 6,065,056 A | 5/2000 | Bradshaw et al. |
| 6,065,059 A | 5/2000 | Shieh et al. |
| 6,073,135 A | 6/2000 | Broder et al. |
| 6,092,194 A | 7/2000 | Touboul |
| 6,182,118 B1 | 1/2001 | Finney et al. |
| 6,185,681 B1 | 2/2001 | Zizzi |
| 6,233,618 B1 | 5/2001 | Shannon |
| 6,246,977 B1 | 6/2001 | Messerly et al. |
| 6,266,664 B1 | 7/2001 | Russell-Falla et al. |
| 6,295,529 B1 | 9/2001 | Corston-Oliver et al. |
| 6,295,559 B1 | 9/2001 | Emens et al. |
| 6,301,658 B1 | 10/2001 | Koehler |
| 6,338,088 B1 | 1/2002 | Waters et al. |
| 6,356,864 B1 | 3/2002 | Foltz et al. |
| 6,357,010 B1 | 3/2002 | Viets et al. |
| 6,389,472 B1 | 5/2002 | Hughes et al. |
| 6,418,433 B1 | 7/2002 | Chakrabarti et al. |
| 6,460,141 B1 | 10/2002 | Olden |
| 6,466,940 B1 | 10/2002 | Mills |
| 6,493,744 B1 | 12/2002 | Emens et al. |
| 6,493,758 B1 | 12/2002 | McLain |
| 6,539,430 B1 | 3/2003 | Humes |
| 6,571,249 B1 | 5/2003 | Garrecht et al. |
| 6,615,242 B1 * | 9/2003 | Riemers ................ 709/206 |
| 6,675,169 B1 | 1/2004 | Bennett et al. |
| 6,742,003 B2 | 5/2004 | Heckerman et al. |
| 6,779,021 B1 * | 8/2004 | Bates et al. ................ 709/206 |
| 6,785,732 B1 | 8/2004 | Bates et al. |
| 6,804,780 B1 | 10/2004 | Touboul |
| 6,832,230 B1 | 12/2004 | Zilliacus et al. |
| 6,978,292 B1 | 12/2005 | Murakami et al. |
| 6,988,209 B1 | 1/2006 | Balasubramaniam et al. |
| 7,006,993 B1 * | 2/2006 | Cheong et al. ................ 705/35 |
| 7,051,200 B1 | 5/2006 | Manferdelli et al. |
| 7,058,822 B2 | 6/2006 | Edery et al. |
| 7,065,483 B2 | 6/2006 | Decary et al. |
| 7,080,000 B1 | 7/2006 | Cambridge |
| 7,089,246 B1 | 8/2006 | O'Laughlen |
| 7,100,199 B2 | 8/2006 | Ginter et al. |
| 7,136,867 B1 | 11/2006 | Chatterjee et al. |
| 7,185,361 B1 | 2/2007 | Ashoff et al. |
| 7,209,893 B2 | 4/2007 | Nii |
| 7,213,069 B2 | 5/2007 | Anderson et al. |
| 7,219,299 B2 * | 5/2007 | Fields et al. ................ 715/205 |
| 7,260,583 B2 | 8/2007 | Wiener et al. |
| 7,313,823 B2 | 12/2007 | Gao |
| 7,376,969 B1 | 5/2008 | Njemanze et al. |
| 7,447,215 B2 | 11/2008 | Lynch et al. |
| 7,487,540 B2 * | 2/2009 | Shipp ................ 726/22 |
| 7,536,437 B2 | 5/2009 | Zmolek |
| 7,568,002 B1 * | 7/2009 | Vacanti et al. ................ 709/217 |
| 7,603,687 B2 | 10/2009 | Pietraszak et al. |
| 7,668,920 B2 * | 2/2010 | Lin et al. ................ 709/206 |
| 7,725,937 B1 | 5/2010 | Levy |
| 2001/0032205 A1 | 10/2001 | Kubaitis |
| 2001/0047474 A1 | 11/2001 | Takagi |
| 2002/0059221 A1 | 5/2002 | Whitehead et al. |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095592 A1 | 7/2002 | Daniell et al. |
| 2002/0099952 A1 | 7/2002 | Lambert et al. |
| 2002/0120705 A1 | 8/2002 | Schiavone et al. |
| 2002/0129140 A1 | 9/2002 | Peled et al. |
| 2002/0129277 A1 | 9/2002 | Caccavale |
| 2002/0174358 A1 | 11/2002 | Wolff et al. |
| 2002/0199095 A1 | 12/2002 | Bandini et al. ................ 713/151 |
| 2003/0018903 A1 | 1/2003 | Greca et al. |
| 2003/0028564 A1 | 2/2003 | Sanfilippo |
| 2003/0074567 A1 | 4/2003 | Charbonneau |
| 2003/0093694 A1 | 5/2003 | Medvinsky et al. |
| 2003/0110168 A1 | 6/2003 | Kester et al. |
| 2003/0135756 A1 | 7/2003 | Verma |
| 2003/0149692 A1 | 8/2003 | Mitchell |
| 2003/0182420 A1 | 9/2003 | Jones et al. |
| 2003/0185395 A1 | 10/2003 | Lee et al. |
| 2003/0185399 A1 | 10/2003 | Ishiguro |
| 2004/0003139 A1 | 1/2004 | Cottrille et al. |
| 2004/0003286 A1 | 1/2004 | Kaler et al. |
| 2004/0030913 A1 | 2/2004 | Liang et al. |
| 2004/0034794 A1 | 2/2004 | Mayer et al. |
| 2004/0054498 A1 | 3/2004 | Shipp |
| 2004/0054521 A1 | 3/2004 | Liu |
| 2004/0088570 A1 * | 5/2004 | Roberts et al. ................ 709/206 |
| 2004/0117624 A1 | 6/2004 | Brandt et al. |
| 2004/0153305 A1 | 8/2004 | Enescu et al. |
| 2004/0153644 A1 | 8/2004 | McCorkendale |
| 2005/0015626 A1 | 1/2005 | Chasin |
| 2005/0022008 A1 * | 1/2005 | Goodman et al. ................ 713/201 |
| 2005/0033967 A1 | 2/2005 | Morino et al. |
| 2005/0060140 A1 | 3/2005 | Maddox et al. |
| 2005/0066197 A1 | 3/2005 | Hirata et al. |
| 2005/0071748 A1 * | 3/2005 | Shipp ................ 715/501.1 |
| 2005/0086520 A1 | 4/2005 | Dharmapurikar et al. |
| 2005/0091535 A1 | 4/2005 | Kavalam et al. |
| 2005/0108557 A1 | 5/2005 | Kayo et al. |
| 2005/0108639 A1 * | 5/2005 | Fields et al. ................ 715/531 |
| 2005/0120229 A1 | 6/2005 | Lahti |
| 2005/0131868 A1 | 6/2005 | Lin et al. |
| 2005/0138353 A1 | 6/2005 | Spies |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0256955 A1 * | 11/2005 | Bodwell et al. ................ 709/217 |
| 2005/0273858 A1 | 12/2005 | Zadok et al. |
| 2005/0283836 A1 | 12/2005 | Lalonde et al. |
| 2006/0004636 A1 | 1/2006 | Kester et al. |
| 2006/0020814 A1 | 1/2006 | Lieblich et al. |
| 2006/0026105 A1 | 2/2006 | Endoh |
| 2006/0026611 A1 | 2/2006 | Zakas |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0068755 A1 | 3/2006 | Shraim et al. |
| 2006/0080735 A1 | 4/2006 | Brinson et al. |
| 2006/0095459 A1 | 5/2006 | Adelman et al. |
| 2006/0095965 A1 | 5/2006 | Phillips et al. |
| 2006/0101514 A1 | 5/2006 | Milener et al. |
| 2006/0129644 A1 * | 6/2006 | Owen et al. ................ 709/206 |
| 2006/0161986 A1 | 7/2006 | Singh et al. |
| 2006/0168006 A1 | 7/2006 | Shannon et al. |
| 2006/0191008 A1 | 8/2006 | Fernando et al. |
| 2006/0212723 A1 | 9/2006 | Sheymov |
| 2006/0253537 A1 * | 11/2006 | Thomas ................ 709/206 |
| 2006/0259948 A1 | 11/2006 | Calow et al. |
| 2006/0265750 A1 | 11/2006 | Huddleston |
| 2006/0288076 A1 | 12/2006 | Cowings et al. |
| 2007/0005762 A1 * | 1/2007 | Knox et al. ................ 709/224 |
| 2007/0011739 A1 | 1/2007 | Zamir et al. |
| 2007/0028302 A1 | 2/2007 | Brennan et al. |
| 2007/0130351 A1 | 6/2007 | Alperovitch et al. |
| 2007/0156833 A1 | 7/2007 | Nikolov et al. |
| 2007/0299915 A1 * | 12/2007 | Shraim et al. ................ 709/206 |
| 2008/0267144 A1 | 10/2008 | Jano et al. |
| 2008/0295177 A1 | 11/2008 | Dettinger et al. |

FOREIGN PATENT DOCUMENTS

| | | |
|---|---|---|
| EP | 1058199 | 5/2000 |
| EP | 1 278 330 | 1/2003 |
| EP | 1 280 040 | 1/2003 |
| EP | 1 329 117 | 7/2003 |
| EP | 1 457 885 | 9/2004 |
| EP | 1 484 893 | 12/2004 |
| EP | 1484893 | 12/2004 |
| EP | 1 494 409 | 1/2005 |
| EP | 1 510 945 | 3/2005 |
| EP | 1 638 016 | 3/2006 |
| EP | 1 643 701 | 4/2006 |
| GB | 2418330 | 3/2006 |
| JP | 10 243018 | 9/1998 |
| JP | 2000-235540 | 8/2000 |
| WO | WO 96/05549 A1 | 2/1996 |
| WO | WO 96/042041 | 12/1996 |
| WO | WO 01/24012 | 4/2001 |
| WO | WO 01/75651 | 10/2001 |
| WO | WO01/75651 | 10/2001 |
| WO | WO 2004/077710 | 9/2004 |
| WO | WO2005/004012 | 1/2005 |
| WO | WO 2005/010692 | 2/2005 |
| WO | WO2005/010692 | 2/2005 |
| WO | WO 2005/017708 | 2/2005 |
| WO | WO 2005/022319 | 3/2005 |
| WO | WO2005/074213 | 8/2005 |
| WO | WO 2005/074213 | 8/2005 |
| WO | WO 2005/119488 | 12/2005 |
| WO | WO 2006/027590 | 3/2006 |
| WO | WO 2006/062546 | 6/2006 |
| WO | WO 2006/136605 | 12/2006 |
| WO | WO 2008/008339 | 1/2008 |

OTHER PUBLICATIONS

Great Britain Search Report, Application No. GB0512744.4, Oct. 2005.

Abiteboul, et al., The Lorel query language for semistructured data, Int'l Journal on Digital Libraries, Apr. 1, 1997, vol. 1, Issue 1, pp. 68-88.

Adam Lyon, "Free Spam Filtering Tactics Using Eudora,", May 21, 2004, pp. 1-4.

Chawathe, et al., Representing and querying changes in a semistructured data, Proceedings from 14th Int'l Conference, Feb. 23-27, 1998, pp. 4-13.

Cohen, F., A Cryptographic Checksum for Integrity Protection, Computers & Security, Elsevier Science Publishers, Dec. 1, 1987, vol. 6, Issue 6, pp. 505-510, Amsterdam, NL.

Dahan, M. Ed., "The Internet and government censorship: the case of the Israeli secretservice" Online information., Proceedings of the International Online Information Meeting, Oxford, Learned Infomration, GB, Dec. 12-14, 1989, vol. Meeting 13, Dec., Issue XP000601363, pp. 41-48, Sections 1,3., London.

Dell Zhang, et al., A data model and algebra for the web, Proceedings 10th Int'l Workshop on Florence, Italy, Sep. 1-3, 1999, pp. 711-714.

Gittler F., et al., the DCE Security Service, Pub: Hewlett-Packard Journal, Dec. 1995, pp. 41-48.

Goldman, R., et al., DataGuides: Enabling Query Formulation and Optimization in Semistructured Databases, Proceedings of the International Conference on Very Large Data Bases, Aug. 26, 1997, pp. 436-445.

IBM Technical Disclosure Bulletin, Mean to Protect System from Virus, IBM Corp., Aug. 1, 1994, Issue 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report and Written Opinion dated Jun. 30, 2008 for PCT Patent Application No. PCT/US2007/024557.

International Search Report and Written Opinion for International Application No. PCT/GB2005/003482, Dec. 9, 2005.

IronPort Web Reputation: Protect and Defend Against URL-Based Threats; Ironport Systems, Apr. 2006, 8 pages.

Nestorov, et al., Representative objects: concise representations of semistructured, hierarchical Data, Proceedings, 13th Int'l Conference in Birmingham, UK, Apr. 7-11, 1997, pp. 79-90.

PCT International Search Report and Written Opinion for International Application No. PCT/US2008/052483, PCT, Feb. 11, 2009.

PCT International Search Report for Application No. PCT/EP2006/063474, PCT, Sep. 2006.

Reid, Open Systems Security: Traps and Pitfalls, Computer & Security, 1995, Issue 14, pp. 496-517.

Resnick, P. et al., "PICS: Internet Access Controls Without Censorship", Communications of the Association for Comuting Machinery, ACM, Oct. 1, 1996, vol. 39, Issue 10, pp. 87-93, New York, NY.

Stein, Web Security—a step by step reference guide, Addison-Wesley, 1997, pp. 387-415.

Symantec Corporation, E-security begins with sound security policies, Announcement Symantec, XP002265695, Jun. 14, 2001, pp. 1,9.

Williams, R., Data Integrity with Veracity, Retrieved from the Internet: <URL: ftp://ftp.rocksoft.com/clients/rocksoft/papers/vercty10.ps>, Sep. 12, 1994.

Zhang et al., The Role of URLs in Objectionable Web Content Categorization, Web Intelligence, 2006.

\* cited by examiner

METHOD AND SYSTEM FOR FILTERING ELECTRONIC MESSAGES

FIELD OF THE INVENTION

The present invention relates to a method and system for filtering electronic messages, and is particularly, but not exclusively, suitable for filtering emails having data therein identifying a link to a remote processing system, which, when activated, causes the recipient to retrieve data from the remote processing system.

BACKGROUND OF THE INVENTION

Internet email (SMTP) is an inherently insecure medium, and it is well known as a convenient vehicle for advertising products and services in an unsolicited manner. A considerable amount of effort has been focused on developing methods for filtering such unsolicited emails, many of which are based on searching for and identifying patterns within various fields of an email. In an attempt to bypass these filters, new methods are constantly being developed, some of which rely on the recipient of an email performing additional actions beyond reading the incoming email.

In one such method, a Uniform Resource Locator (URL) is specified within the body of the email, which, at first sight appears to originate from a legitimate source, but which is in fact disguised; when the recipient clicks on the URL, a file is downloaded onto the recipient's machine and can cause unexpected behaviour. For example, such URLs may direct the recipient to visit a site which is similarly-named to a popular site but which is not operated by the organization owning the well known site, and which attempts to capture user identification and financial details. Alternatively a URL may be crafted to exploit vulnerability in the recipient's web browsing software or result in downloading of an executable process that runs autonomously on the recipient's machine without the knowledge of the recipient.

Several workers have developed methods directed towards identifying unsolicited emails on the basis of URLs contained therein. For example, International patent application having publication number WO2004/114614 describes comparing the attributes of URLs with attributes known to be characteristic of spam, and classifying emails accordingly, while U.S. Pat. No. 6,615,242 describes intercepting an email en route for a recipient, accessing the site corresponding to the URL, analyzing the data retrieved therefrom on the basis of various predetermined criteria, classifying the email accordingly, and transmitting or filtering the email on the basis of the classification. International patent application having publication number WO2004/097676 also describes accessing the site corresponding to the URL, but in this case, if the content is deemed to be acceptable, the URL is replaced with one associated with a trusted site. Thus the recipient of the email can only access the replaced URL, whereupon he is directed to a copy of the original content, which has been saved on the trusted site. In view of the sheer numbers of emails that contain such URLs, the approaches taken in U.S. Pat. No. 6,615,242 and WO2004/097676 incur a significant amount of processing effort; also in relation to U.S. Pat. No. 6,615,242, in view of the fact that the content of the site can change between the analysis being performed and the user accessing the site, there will be instances when the analysis is in any event a waste of processing effort.

It is an object of the present invention to provide an improved and more efficient method of detecting maliciously-crafted web links.

SUMMARY OF THE INVENTION

In accordance with a first aspect of the present invention, there is provided a method of modifying an electronic message during transmission through a communications network, said electronic message having a source address and a recipient address, the method comprising:

interrupting transmission of the electronic message;
identifying a link specified within the electronic message;
analyzing the electronic message on the basis of at least an attribute intrinsic to the received electronic message so as to classify the received message as either a first type of message or a second, different, type of message;
if the received message is classified as the first type of message, modifying the received electronic message so as to replace the link with an alternative network location, said alternative network location corresponding to a remote processing system different to that corresponding to the link; and
transmitting the modified electronic message.

In comparison to known methods, which either modify the links blindly or which perform analysis of the data to which the link is connected, embodiments of the invention selectively modify the link on the basis of various tests relating to attributes intrinsic to the email. This means that only those emails that present some sort of risk to the recipient are modified, and, because the criteria for performing the modification relate to attributes intrinsic to the emails instead of the content associated with the link, the delivery of emails is not significantly delayed by processes involved in retrieval and analysis of data from third party sites.

In preferred arrangements, the analysis is performed on the basis of attributes of the email such as sender, recipient, subject and content of the email etc., and can also be performed on the basis the content and format of the original link itself. In the event that analysis of the email indicates that the link, or the message containing the link, is suspicious the link is modified.

In illustrative embodiments of the invention the link can be of an external or an internal type, and which is contained within the body or subject field of an email. Links of the external type specify network locations, and are commonly described as web links (or URLs), while links of the internal type specify locations or objects etc. within the email. Embodiments of the invention are most suitable for cases where the link is of the external type and specifies a network location; in this aspect of the invention, embodiments provide a means for replacing an unknown URL with a URL that is secure. As a result, when a recipient of the email attempts to access data from within the email, the secure network location subsequently accesses the unknown network location contained within the original email. This means that it is the secure location, not the recipient, which receives data corresponding to the unknown URL and provides a means for screening data accessible from the original URL, and, dependent on the result of the screening, allows or otherwise the recipient access thereto.

This method is particularly useful for emails formatted in accordance with a mark-up language such as the Hyper Text Mark-up Language (HTML), in respect of which forgery and creation of "special" URLs is becoming increasingly prevalent.

In one arrangement the original URL is replaced by the modified URL, and modification can involve encoding the original URL and wrapping the original URL within a URL indicative of the secure network location; in a second arrangement the modification of the URL involves generating a key corresponding to the original URL and wrapping the key within a URL indicative of the secure network location. In this way, when a recipient clicks on the modified URL the recipient's machine is directed to the secure network location, whereupon, under control of a process running on the secure network location, the data that have been wrapped within the secure URL can be retrieved in order to identify whether or not the URL is malicious.

A second aspect of the invention relates to the processing steps that are performed in response to a request for data from the replacement network location, and provide a method of identifying an electronic message as an unsolicited electronic message on the basis of a network location specified therein, wherein data indicative of the electronic message are stored in association with the network location, the method comprising:

responsive to a request for access to the network location from a recipient of the electronic message, accessing data indicative of a classification of said electronic message;

retrieving data associated with said network location and analyzing said retrieved data so as to validate said classification of said electronic message as unsolicited or solicited.

It will therefore be appreciated that embodiments of the invention essentially provide a two-stage fine-tuned analysis of emails, comprising a first-pass analysis for use in deciding whether or not a given URL can be accessed directly, which can be based on attributes of the email other than the URL (but which can additionally take account of the URL), and a second-pass analysis that operates in response to the behaviour of the email recipient and performs the analysis based, specifically, on details of a URL that has been wrapped during the first-pass analysis.

Embodiments of the invention therefore have several distinct advantages over the methods described in the prior art: firstly the first-pass analysis is relatively unintensive, processing-wise, which means that there is a minimal delay to the transmission of emails; secondly emails are selectively modified in an informed manner, based on the first-pass analysis, which means that the recipient is not always directed to the secure processing system when clicking on a URL; and thirdly the second-pass analysis of the data stored at the original URL is only performed in respect of data currently available from the network location, rather than data that were current at the time of analyzing the email during transmission.

A data processing system is also described, which is configured to intercept electronic messages prior to delivery to the intended recipient and perform analysis and selective modification of the intercepted messages in the manner described above.

Further features and advantages of the invention will become apparent from the following description of preferred embodiments of the invention, given by way of example only, which is made with reference to the accompanying drawings.

DETAILED DESCRIPTION OF THE INVENTION

As described above, embodiments of the invention are concerned with protecting email recipients from maliciously-crafted web links, which, most commonly, are embodied in the form of URLs.

Figure 1:
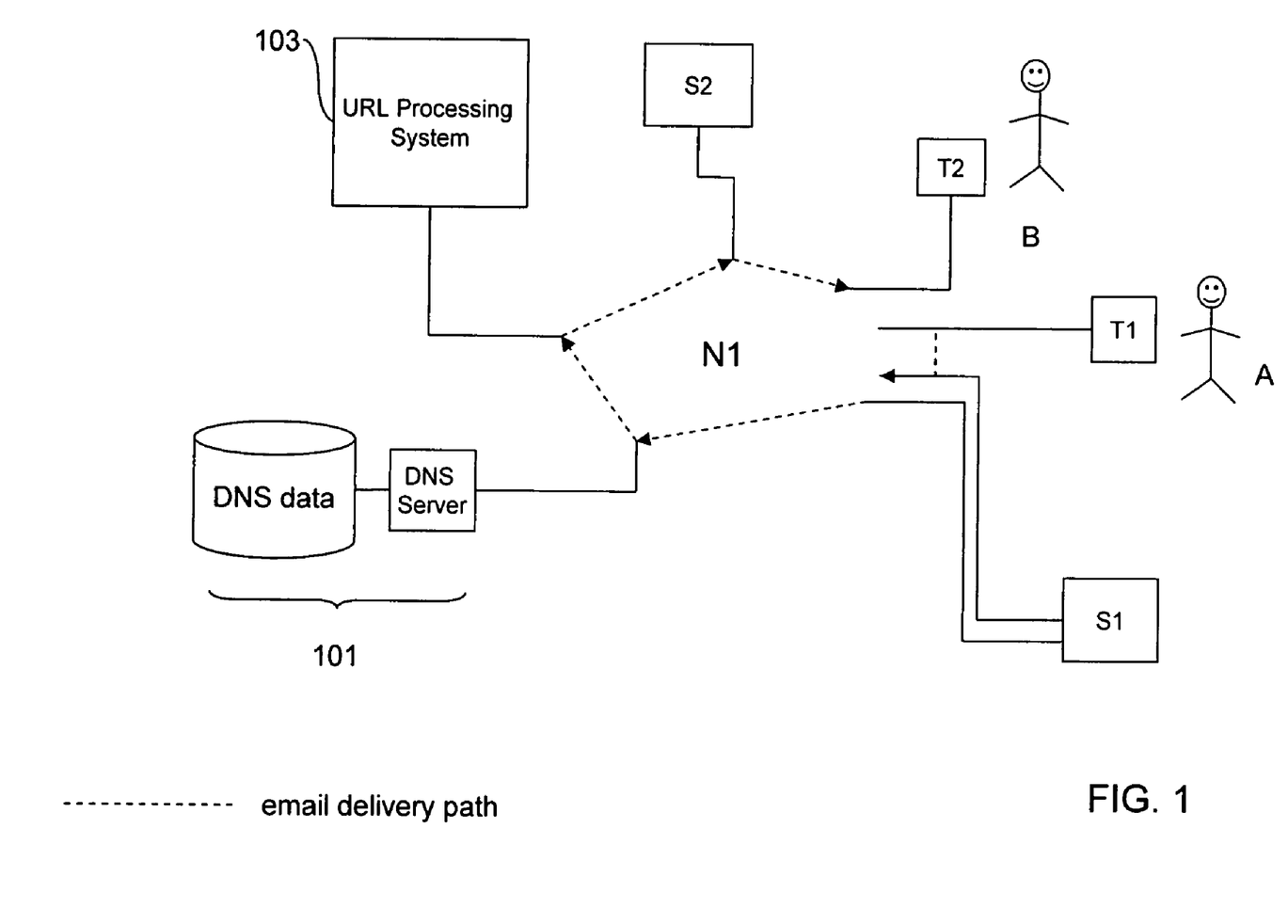
FIG. 1 is a schematic diagram showing an environment within which a URL processing system according to an embodiment of the invention operate.

Most conveniently, a system according to an embodiment of the invention is implemented within the normal email delivery path; referring to FIG. 1, such a delivery path is shown in the context of sender A creating and sending an email to recipient B: the email is sent from terminal T1, at which the sender A has composed the email, and is delivered to a terminal T2 corresponding to the email address of the email. As is known in the art, the email is sent from terminal T1 to a local mail server S1 cooperating with terminal T1, which may reside on a local area network or at an ISP; when the local mail server S1 receives the email, the mail server S1 queries a Domain Name Server (DNS) 101 to obtain the Internet Protocol (IP) address for the recipient's email address.

Figure 2:
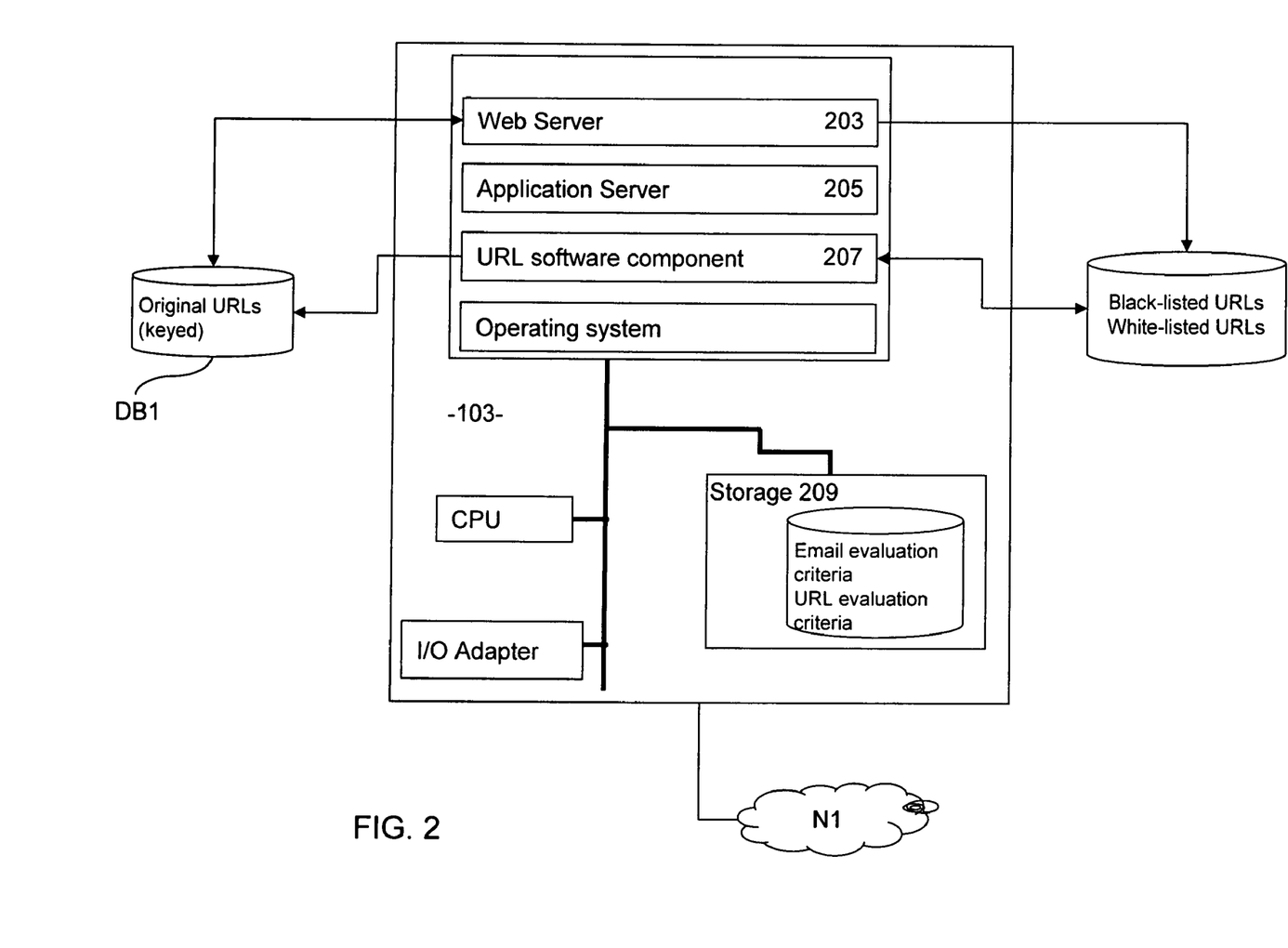
FIG. 2 is a schematic diagram showing an example of components of the URL processing system shown in FIG. 1.

In the delivery path according to a preferred arrangement, the DNS record corresponding to the recipient's address is preconfigured to comprise data identifying a URL processing system 103 (e.g. by modifying the associated mail exchange (MX) record), which means that all emails destined for recipient B are automatically directed to the URL processing system 103 instead of to the mail server corresponding to recipient B's email address. (A processing system that intercepts emails in the delivery path is commonly referred to as an email relay or a message transfer agent (MTA); accordingly, it will be appreciated that the URL processing system 103 is a type of message transfer agent.) As shown in FIG. 2 the URL processing system 103 preferably comprises an application server, a web server, various conventional and bespoke processing components, and can comprise one or a plurality of machines, which collectively analyse emails in accordance with various criteria, as described in more detail below. The URL processing system 103 is connected to various servers and gateways, typically via a public network such as the Internet N1, including the destination email server S2 corresponding to the recipient's email address. Accordingly, once the URL processing system 103 has processed the email, it transmits the processed email to the email server S2 corresponding to terminal T2.

As will be described in more detail below, under certain conditions—e.g. when an email contains a URL satisfying various conditions—the URL processing system 103 selectively modifies the email before sending onto the email server S2. The modification involves adding data to the email that enables the recipient B to request information relating to the original URL that was included in the email sent by sender A, but that directs the request to a secure processing system rather than to the URL specified in the original email.

Figure 3:
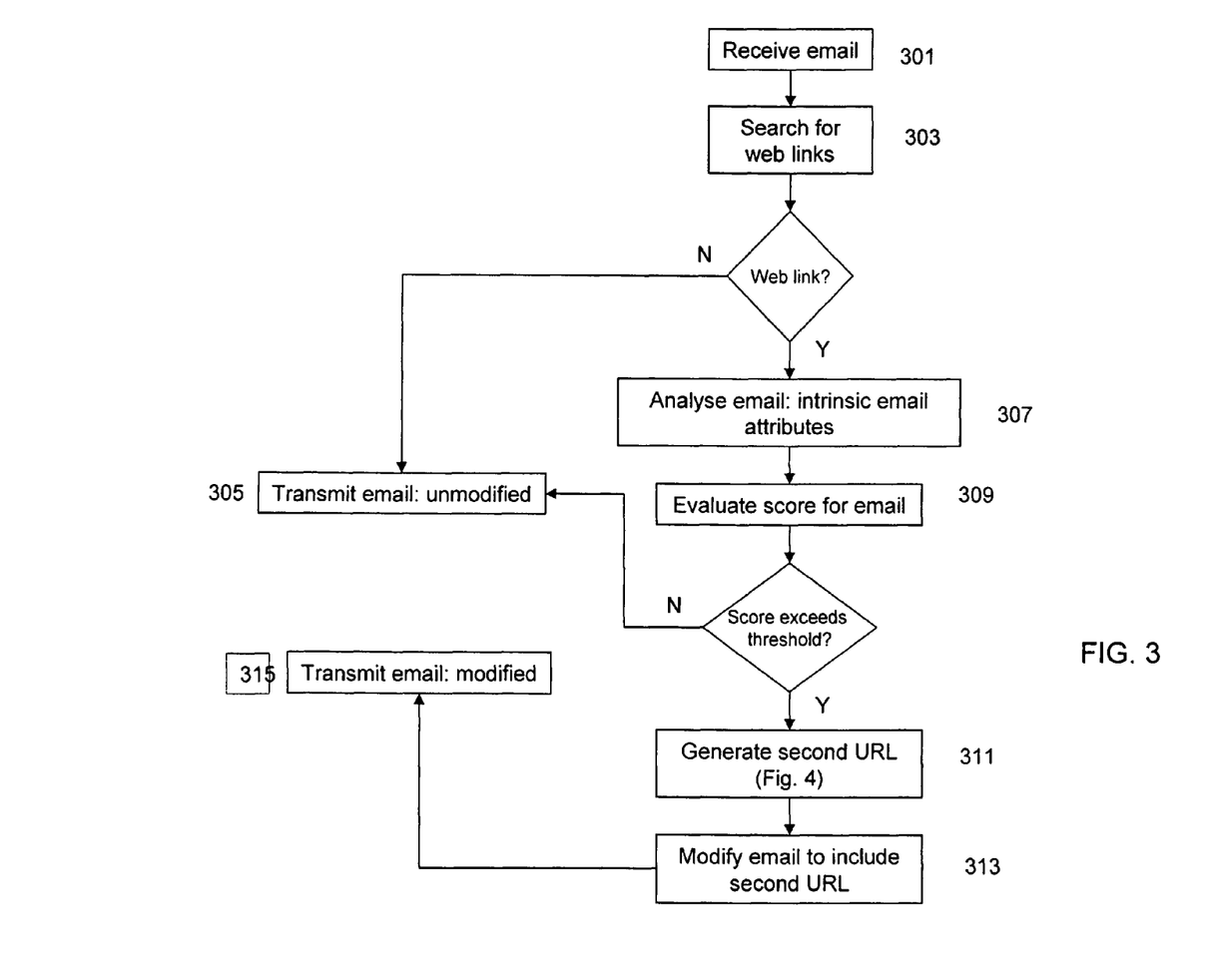
FIG. 3 is a schematic flow diagram showing steps performed by a part of the URL processing system of FIG. 2.
Figure 4:
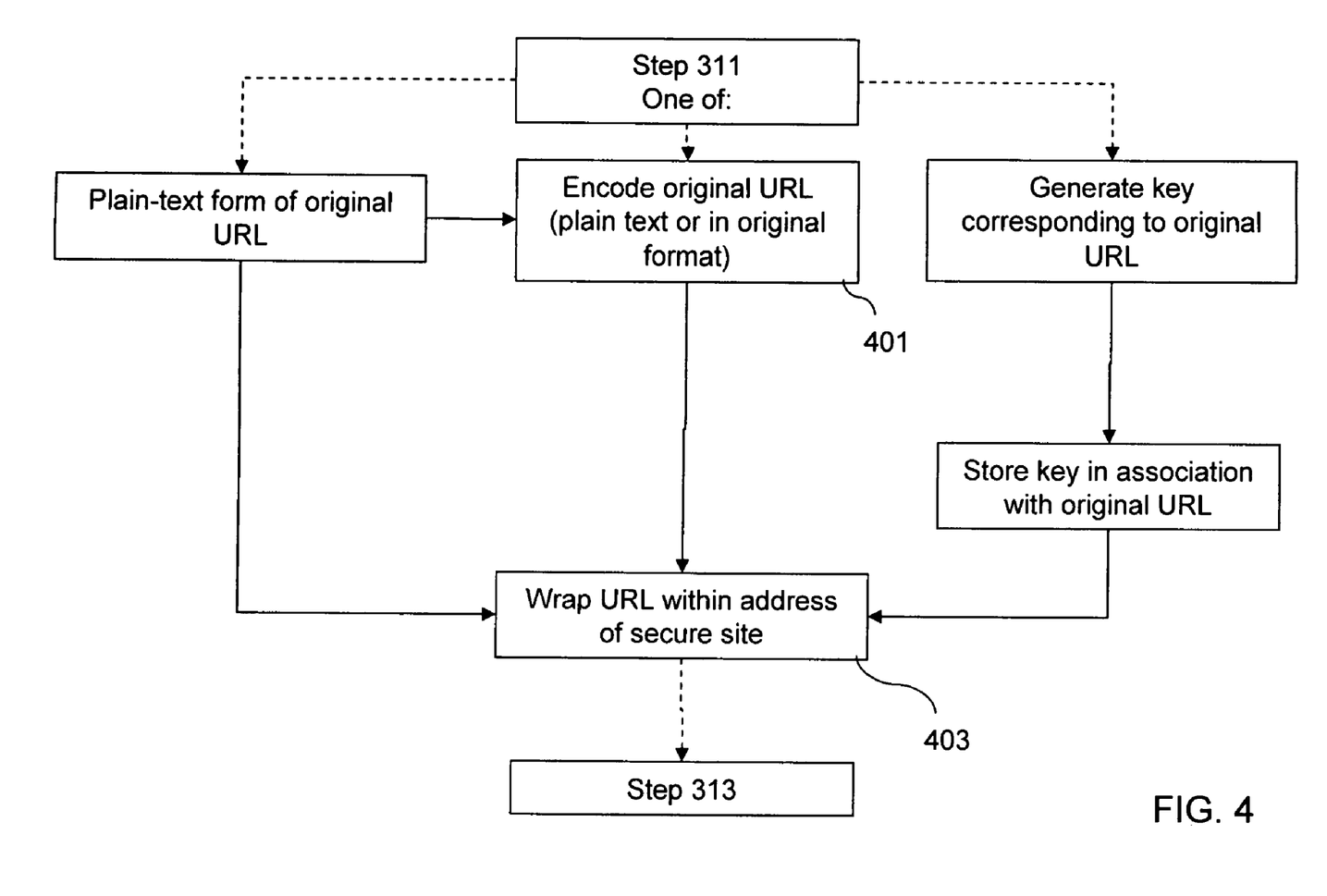
FIG. 4 is a schematic flow diagram showing further steps performed by part of the URL processing system of FIG. 2.

The processing performed by the URL processing system 103 in accordance with embodiments will now be described with reference to FIGS. 3 and 4. Turning first to FIG. 3, when an email is received by the URL processing system 103, it is passed to the application server 205, for processing by the URL software component 207 (step 301). Once received by the URL software component 207, the email is analysed for the presence of otherwise of one or more web links or hyperlinks (step 303); in the event that no such link is identified, the software component 207 passes the email—unmodified—back to the application server 205, for routing to server S2 in the normal manner (step 305). In one embodiment, the presence of a URL string may be detected in an email formatted in accordance with a mark-up language (e.g., HTML, XML) based on formatting data surrounding the URL string in the message. As is known in the art, URLs can be used to link to various parts within, and images attached to, a document (in which case the URL takes the form of an <img> tag), or to data that is externally accessible (externally accessible in relation to the email or email system). In the case of URLs that point to externally accessible data, in the HTML message, the URL may have the following format: <a href="http://www.s-esame.com">, in which case the software component 207 is configured to search through the HTML message for a string comprising "http:" or "href=", extracting the data immediately following this string.

In the case where the email is determined to contain a URL, the software component 207 can proceed to analyse the email (step 307), either on the basis of attributes of the email alone (such as subject, format of sender and recipient address, or text within the email, as will be described below), or on the basis of these attributes and the a review of the URL; methods are known in the art for performing at least some of such analysis of an email, and include those commonly referred to as "Spam detection methods".

In relation to performing the analysis on the basis of the URL, as mentioned above, URLs can be used to link either to various parts within (or of) the email, or to a site that is externally accessible. The software component 207 is configured to identify the type of link (internal or external), and if the link is identified as being of the external type, the software component 207 can further review the URL on the basis of one or more of the following parameters, which are stored in storage 209:

Domains: URLs may include sub-domains and redirections to target URLs, and the inclusion of different sub-domains into a URL may enable the creation of a unique URL which points to the same target URL. For example, URL "http://spamtastic.test.co.uk" can be specified from URLs that include different sub-domains. Accordingly the URL string can be examined for the presence of different sub-domains (here there are two: spamtastic.test.co.uk; test.co.uk);

Redirect URLs: a URL can comprise another URL that points to a particular target URL;

For example, the URL "http://random.com/date/03/*http://www.spamtasic.co.uk" actually points to the target URL "http://www.spamtasic.co.uk". Accordingly the URL string can be examined for redirection to a different URL;

Extraneous information within the URL: a user name, password, "@" signs, numeric character references (which specify the code position of a character in the document character set), character entity references (which use symbolic names), buffer overflows, null-padding, and embedded null characters. Accordingly the URL string can be examined for the presence of such information;

Hexadecimal encoded ASCII HTML anchor characters in the URL "http://%4%4%4.sesame.com" (which corresponds to "http://www.sesame.com"), and IP addresses encoded as hexadecimal or decimal representations. Accordingly the URL string can be examined for the URL being encoded in such a format.

In addition, the URL processing system 103 can maintain, or have access to, a URL blacklist that includes URLs that are known to be indicative of spam and/or relating to an email virus, and the software component 207 can be arranged to compare the or each URL within the email with those listed in the black-list; when the blacklisted URLs are stored as hash values, it is convenient for the software component 207 to generate a hash value of the or each URL within the email, enabling the comparison to be performed on the basis of the generated and stored hash values. Additionally or alternatively, the software component 207 could be arranged to compare the URL with a list of known URLs, and the URL categorized as either known or unknown.

In relation to parameters (or attributes) that are intrinsic to the email, these include the following:

Sender email address or sending system IP address;

Objects associated with the email e.g. very small executable file, bayesian match with spam or virus-laden email;

Historical behaviour relating to previously seen emails having characteristics matching those of the email under analysis, in particular whether or not the previously seen emails have been categorized as spam;

Type of external link: the link, whilst being of a web link format and relating to a system external to the email, corresponds to a system that is not publicly accessible. Such types of external links include those generally categorized as an RFC-1918 IP address, which is not reachable from the Internet; examples include 10.192.168.## or 10.172.16-31.##; and Position of the link within the email.

In different arrangements, the email is scored on the basis of one, some, or all of the above parameters, and the individual scores combined in dependence on prespecified weightings. In addition to having access to a "black-list" of URLs, the software component 207 could have access to a "white-list" of URLs (each list being mutually exclusive), and if the URL is listed in the "white-list", the scoring be modified accordingly. This could be a particularly useful test criterion for emails that, on the basis of the other analysis techniques, would otherwise appear borderline-suspicious. Once an overall score has been evaluated the software component 207 compares the score with a predetermined threshold (step 309); in the event that the score exceeds the threshold, the URL is modified (step 311) so as to generate a second URL; otherwise the email is passed to the application server 205 for routing to the recipient (305).

If generated, the second URL is subsequently inserted into the email (step 313) in the place of the URL included in the original email, and the modified email is transmitted (step 315) to the recipient via the application server 205.

The second URL is formulated such that when the recipient of the modified email clicks thereon, the recipient's browser navigates to a secure processing system, which, in a preferred embodiment, is web server 203 associated with the URL processing system 103 itself, but could alternatively be a processing system maintained by a third party (not shown), or a web server that is disassociated from the URL processing system 103.

The second URL is related to the URL contained within the original email in such a way that the secure processing system 203 subsequently accesses the URL contained within the original email; this means that it is the secure processing system 203, not the recipient's terminal T2, which receives data corresponding thereto. The URL processing system 103 thus effectively screens the data retrieved from the original URL, and, dependent on the result of the screening, allows or otherwise allow the recipient access thereto.

Various methods for generating the second URL will now be described with reference to FIG. 4. In a preferred arrangement the software component encodes (step 401) the original URL—e.g. by applying strong encryption such as triple DES to the combination of the original URL plus a small checksum—and then wraps (step 403) the encoded original URL within a URL that identifies the web server 203. A benefit of encoding the original URL is that it securely insures the second URL against tampering; preferably the encoded original email comprises printable characters in a restricted alphabet, which prevents errors being introduced during delivery by the recipient's email system. An example of such an encoded and wrapped URL is as follows:
http://www.mailcontrol.com/url/380uq7VXkW5HB
kKOrslr9ymSVKXf345c0!gB7OXm2XY7sdQ%2BN4
adxe KXgEXj8tjmk77MC!bJHUEmZX5fvyO92owXx
1Dx!F5R!yjIALwCVNO3nPqLWSlVTAAmx6Q8vhBLNv
UVHhROwwzcZ6Ngd0pMT cG9hp1qNzSu!TRlV9
Cd57pJswOqznWGJbAC9HWYEJellAw01LrKcOhlBrp5%
2Bax8qY98MtP0ciStbD5BjV %2Bm46
hzvDtwtuil68JJfVqELKGSewY52w41WvgY
cs6dH4RU!Z!zBwG9N61A9XAiUY!1JfAchUXJwv%2BQ The software component could alternatively wrap the original URL in plain text form, which has the benefit of providing visibility of what the original URL intended. In yet another alternative the software component 207 could generate a key (e.g. the hash value computed for the original URL as part of step 307), store the original URL together with the generated key in a database DB1, and wrap the generated key within the URL that identifies the web server 203. As a yet further alternative the software component could be arranged to encode the original URL if it is less than a specified length, or to generate, store and wrap a key corresponding to the original URL if it exceeds the specified length.

When the email is received by the recipient, the recipient can elect to click on the second URL in the normal way; as will be appreciated from the foregoing, this causes the browser running on terminal T2 to attempt to retrieve data from the web server 203. Accordingly, the processing steps carried out by the web server 203 in response to the recipient clicking on the second URL will now be described with reference to FIG. 5.

Figure 5:
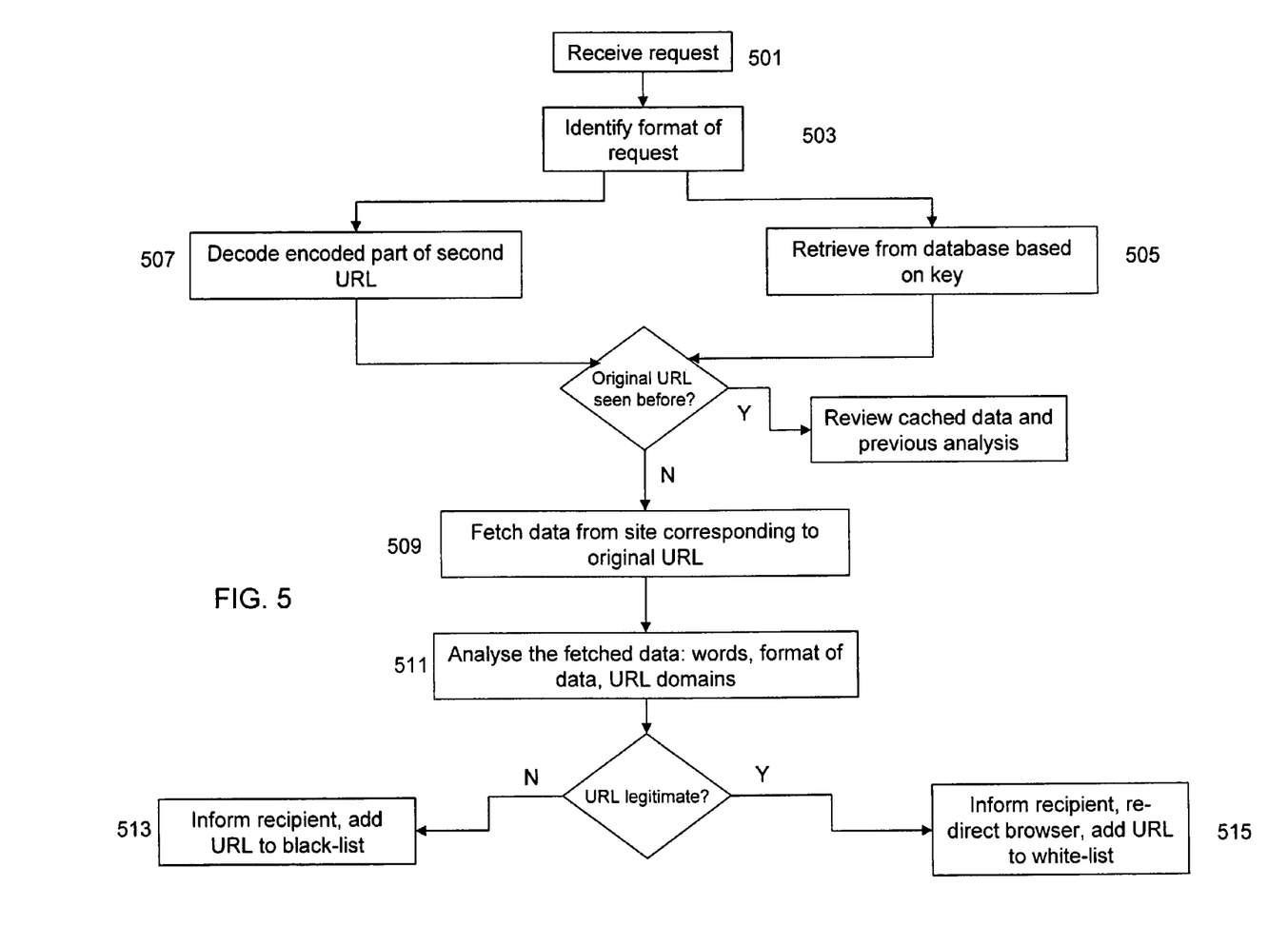
FIG. 5 is a schematic flow diagram showing steps performed by a web server shown in FIG. 2 configured in accordance with embodiments of the invention.

Preferably the second URL comprises data enabling the web server 203 to identify the format of the request (i.e. the format of the second URL): accordingly, in response to a request from the browser of terminal T2 (step 501), the web server 203 is arranged to identify the format of the request (step 503). In the case of the second URL comprising a key associated with the original URL, the web server 203 accesses the database DB1 so as to retrieve the original URL (step 505); in the case of the second URL comprising an encoded version of the original URL, the process P1 decodes the encoded data in accordance with an encoding scheme corresponding thereto (step 507).

Once the original URL has been retrieved and/or decoded, information is fetched from a site designated by the original URL (step 509). This fetched information can be advantageously cached (stored locally) so that the site designated by the URL need not be contacted each time a given URL is detected in a message. The web server 203 analyzes the fetched data (step 511) in accordance with evaluation criteria stored in storage 209. The evaluation criteria 209 causes the web server 203 to search for predetermined strings (e.g., "bet", "floan", "$$$", etc.), each of the predetermined string having been previously rated as indicative of the fetched information being spam. For example, the string "car" can be assigned a score of 5, while the string "$$$" can be a score of 200, where a higher score indicates a higher likelihood that the string is from a spam website.

Step 511 can also involve the web server 203 identifying whether the URL is linked to an executable, which, when accessed, would result in a process (e.g. a keyboard logger) being run on the machine from which the URL is accessed. Accordingly the web server 203 reviews the format of the fetched data, and, if the site corresponding to the original email tries to download binary data, the web server 203 may quarantine the data for further analysis or alternatively analyse the binary data with an anti-virus tool and, depending on the results of this analysis, choose to quarantine the data. It is to be understood that the nature of this further analysis is not the subject of the present application; however, if the further analysis indicates that the binary data corresponds to a Trojan process such as a keyboard logger, the web server 203 sends a message indicative of same to the recipient and adds data indicative of the URL to a repository of "black-listed" URLs (step 513).

In addition the evaluation criteria 209 causes the web server 203 to review the content of the original URL to identify whether it is linked to another, different site, in which case the above-mentioned analysis is performed in relation to the linked site.

If the original URL appears to be authentic, the web server 203 informs the recipient accordingly (step 515) and automatically retrieves data corresponding to the authenticated website for display on the recipient's browser. Preferably the retrieved data are displayed within a frame corresponding to the web server 203, and the display frame includes means for the recipient to post comments relating to the retrieved data. Such a facility would be particularly useful in view of the fact that step 511 is essentially a rules-based process, and therefore only capable of detecting malicious links that conform to established detection patterns and methods; by providing recipients with a means to report a web site that the web server 203 has identified as be authentic, the repository for evaluation (209) can be updated.

In addition the web server 203 adds data indicative of the URL to the repository of "white-listed" URLs. The data in the black-listed and white-listed repositories can be reviewed by the software component 207 during the initial analysis of the original URL at step 307, as described above, as well as cascaded to other, third party, email analysis systems.

Whilst the above-embodiments describe modifying the original URL in the event that the original URL or the email message within which the original URL appears to be suspicious, it will be appreciated that the original URL could be modified irrespective of the apparent suspiciousness or otherwise of the email. Such arrangements would most conveniently be implemented by omitting steps 307 and 309, so that the URL software component 207 automatically modifies any URLs detected within an email as per step 311. An advantage of this arrangement is that the amount of processing in respect of any given intercepted email is reduced, resulting in a higher throughput of email transmission.

Implementation Details

Whilst in the above-described arrangements, the URL processing system 103 is described as comprising a particular number and configuration of software components, it will be appreciated that the invention could be embodied as a suite of software components, and written using a procedural or object-oriented programming language. More specifically, the above-described embodiments describe the second URL as corresponding to web server 203, which can be written and implemented in any programming language suitable for development of web-based applications, such as the Java™, Perl or PHP programming language. In one arrangement the URL software component 207 is written in the same programming language as that used for the web server 203, to facilitate conformance to the same format for creation, encryption and decryption of the second URL. However, it will be appreciated that the respective software components could be implemented in different programming languages, in which case the URL processing system 103 would include a library facilitating translation between the languages (for the purposes of encrypting and decrypting the second URL).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of modifying an electronic message during transmission through a communications network, said electronic message having a source address and a recipient address, the method comprising:
   interrupting transmission of the electronic message;
   identifying, by use of a processor, a first link specified within the electronic message, said first link directed to a first network location;
   analyzing, by use of a processor, at least the electronic message on the basis of at least one of an attribute of the first link, independent of content of the first network location associated with the first link, and at least an attribute intrinsic to the electronic message so as to classify the electronic message as either a suspect message or an acceptable message;
   in response to classification of the electronic message as a suspect message, modifying, by use of a processor, the electronic message, wherein modifying the electronic message comprises:
      modifying the first link to comprise link matter that represents the first link; and
      wrapping the link matter within a second link directed to an alternative network location, said alternative network location corresponding to a remote processing system different from that corresponding to the first link;
   transmitting the modified electronic message; and
   in response to classification of the electronic message as an acceptable message, transmitting the unmodified message.

2. A method according to claim 1, wherein modifying the first link comprises encoding the first link so as to generate said link matter.

3. A method according to claim 1, wherein modifying the first link comprises assigning an alias to the first link so as to generate said link matter.

4. A method according to claim 1, wherein wrapping the link matter within the second link comprises containing the link matter within the second link so as to associate said link matter with the second link.

5. A method according to claim 1, including analyzing the transmitted electronic message on the basis of a criterion unrelated to the first network location.

6. A method according to claim 5, including analyzing the transmitted electronic message on the basis of a criterion relating to the first network location.

7. A method according to claim 1, including analyzing the transmitted electronic message on the basis of a criterion relating to at least one other attribute of the electronic message.

8. A method according to claim 7, in which the criterion includes the sender address and/or the recipient address.

9. A method according to claim 1, including comparing the first network location with network locations contained within electronic messages that have previously been identified as of the unsolicited type.

10. A method according to claim 1, including transmitting the modified electronic message to the recipient address.

11. A method according to claim 1, further comprising:
   further classifying the suspect message as an unacceptable message; and
   if the electronic message is classified as an unacceptable message, preventing transmission of the received message.

12. A method of identifying an electronic message as an unsolicited electronic message on the basis of a network location specified therein, wherein data indicative of the electronic message are stored in association with the network location, the method comprising:
   responsive to a request for access to the network location from a recipient of the electronic message, accessing data indicative of a classification of said electronic message;
   retrieving data associated with said network location, independent of data contained at the site associated with the network location, and analyzing, by use of a processor, said retrieved data so as to validate said classification of said electronic message as unsolicited or solicited;
   in response to classification of the electronic message as unsolicited, modifying, by use of a processor, the network location specified in the electronic message, wherein modifying the network location comprises:
      modifying the network location specified in the electronic message to comprise matter that represents said network location; and
      wrapping said matter within a link directed to an alternative network location which corresponds to a remote processing system that is different than the one corresponding to the network location specified in the electronic message;
   allowing access to the alternative network location; and
   in response to classification of the electronic message as solicited, allowing access to the network location specified in the electronic message.

13. A method according to claim 12, in which, responsive to said request, the method includes accessing a processing system corresponding to said network location so as to retrieve said data.

14. A method according to claim 12, in which, responsive to said request, the method includes retrieving data previously accessed from a processing system corresponding to said network location.

15. A method according to claim 12, in which said matter that represents said network location comprises encoded data corresponding to the network location.

16. A method according to claim 12, in which said matter that represents said network location comprises an alias corresponding to the network location, and the method further comprises identifying the network location from the alias.

17. A method according to claim 12, including notifying the recipient of the classification of the electronic message.

18. A method according to claim 12, including transmitting data retrieved from the network location to the recipient in the event that the electronic message is classified as being of the solicited type.

19. A method of modifying an electronic message transmitted through a communications network, the method comprising:
- receiving an electronic message;
- identifying, by use of a processor, first data indicative of a first network location, the first data being independent of data contained at the site associated with the first network location, said first network location being specified within the electronic message;
- analyzing, by use of a processor, the electronic message on the basis of at least an attribute intrinsic to the message and unrelated to the first network location so as to classify the message as either a suspect message or an acceptable message;
- in response to classification of the electronic message as a suspect message, associating, by use of a processor, the first data with second data indicative of a second network location, said second network location corresponding to a remote processing system different to that corresponding to the first network location, wherein associating the first data with second data comprises:
  - generating matter that represents the first data; and
  - wrapping said matter with the second data;
- modifying the electronic message so as to include the second data;
- transmitting the modified electronic message; and
- in response to classification of the electronic message as an acceptable message, transmitting the unmodified electronic message.

20. A system for modifying an electronic message during transmission through a communications network, said electronic message having a source address and a recipient address, the system comprising:
- a network interface for receiving the electronic message before it has been delivered to a device corresponding to the recipient address;
- the system comprising a processor arranged to identify a first link specified within the received electronic message, said first link directed to a first network location, and to analyze at least the electronic message on the basis of at least one of an attribute of the first link, independent of content of the site associated with the first link, and at least an attribute intrinsic to the received electronic message so as to classify the received electronic message as either a suspect message or an acceptable message;
- wherein, in response to classification of the received message as a suspect message, the system is arranged to modify the received electronic message, wherein modifying the electronic message comprises:
  - modifying the first link to comprise link matter that represents the first link; and
  - wrapping the link matter within a second link directed to an alternative network location said alternative network location corresponding to a remote processing system different from that corresponding to the first link;
- wherein the system is further arranged to transmit the modified electronic message; and
- wherein, in response to classification of the received message as an acceptable message, the system is arranged to transmit the unmodified electronic message.

* * * * *